US008374053B2

(12) United States Patent
Seale et al.

(10) Patent No.: US 8,374,053 B2
(45) Date of Patent: Feb. 12, 2013

(54) SEISMIC STREAMER SHAPE ESTIMATION

(75) Inventors: Daniel B. Seale, New Orleans, LA (US);
Dale J. Lambert, Mandeville, LA (US)

(73) Assignee: ION Geophysical Corporation, Houston, TX (US)

( * ) Notice: Subject to any disclaimer, the term of this patent is extended or adjusted under 35 U.S.C. 154(b) by 335 days.

(21) Appl. No.: 12/783,374

(22) Filed: May 19, 2010

(65) Prior Publication Data

US 2011/0286301 A1 Nov. 24, 2011

(51) Int. Cl.
*G01V 1/38* (2006.01)

(52) U.S. Cl. .............................................. 367/19; 367/16

(58) Field of Classification Search .................... 367/16, 367/19

See application file for complete search history.

(56) References Cited

U.S. PATENT DOCUMENTS

| 3,953,827 | A | * | 4/1976 | Le Moal et al. | 367/19 |
| 4,404,664 | A | * | 9/1983 | Zachariadis | 367/19 |
| 4,870,626 | A | | 9/1989 | Tveit | |
| 4,992,990 | A | * | 2/1991 | Langeland et al. | 367/19 |
| 5,668,775 | A | * | 9/1997 | Hatteland | 367/19 |
| 5,761,153 | A | * | 6/1998 | Gikas et al. | 367/19 |
| 6,418,378 | B1 | | 7/2002 | Nyland | |
| 6,590,831 | B1 | * | 7/2003 | Bennett et al. | 367/16 |
| 6,671,223 | B2 | * | 12/2003 | Bittleston | 367/19 |
| 6,775,619 | B2 | * | 8/2004 | Nyland | 702/14 |
| 7,203,130 | B1 | | 4/2007 | Welker | |
| 7,376,045 | B2 | | 5/2008 | Falkenberg et al. | |
| 7,403,448 | B2 | | 7/2008 | Welker et al. | |
| 2007/0091719 | A1 | * | 4/2007 | Falkenberg et al. | 367/19 |
| 2007/0127312 | A1 | * | 6/2007 | Storteig et al. | 367/15 |
| 2008/0008032 | A1 | * | 1/2008 | Welker | 367/16 |
| 2008/0025146 | A1 | * | 1/2008 | Welker | 367/20 |
| 2008/0074946 | A1 | * | 3/2008 | Hillesund et al. | 367/15 |
| 2008/0089174 | A1 | * | 4/2008 | Sollner et al. | 367/21 |
| 2008/0192570 | A1 | * | 8/2008 | Tenghamn et al. | 367/17 |
| 2008/0316859 | A1 | * | 12/2008 | Welker et al. | 367/17 |
| 2009/0122640 | A1 | * | 5/2009 | Hill et al. | 367/16 |
| 2010/0002538 | A1 | * | 1/2010 | Frivik et al. | 367/19 |
| 2010/0020637 | A1 | * | 1/2010 | Welker et al. | 367/16 |
| 2010/0118645 | A1 | | 5/2010 | Welker | |

FOREIGN PATENT DOCUMENTS

DE 10237761 A1 3/2004

OTHER PUBLICATIONS

International Search Report and Written Opinion of the International Searching Authority, PCT/US2011/035830, mailed Sep. 10, 2012, European Patent Office, Rijswijk, NL.

* cited by examiner

*Primary Examiner* — Isam Alsomiri
*Assistant Examiner* — James Hulka
(74) *Attorney, Agent, or Firm* — James T. Cronvich

(57) ABSTRACT

A seismic streamer system and associated methods for estimating the shape of a laterally steered seismic streamer. The streamer is divided into a series of contiguous streamer segments by lateral-steering devices. Heading sensors positioned in forward and aft portions of each segment produce heading readings. Each segment is modeled as having a linear shape in the forward portion and a curved shape in the aft portion. The shape of the segment is estimated according to the model from the heading readings on the segment.

16 Claims, 1 Drawing Sheet

SEISMIC STREAMER SHAPE ESTIMATION

BACKGROUND

The invention relates generally to marine seismic prospecting and more particularly to seismic streamer arrangements and methods for estimating the shapes of laterally steered streamers.

Seismic streamers towed by survey vessels and instrumented with hydrophones receiving seismic reflections are used in marine seismic surveys. The accuracy of the survey depends on an accurate estimate of the shape of each streamer. As the number of streamers towed behind survey vessels has increased, lateral-steering devices attached along the lengths of streamers are becoming a more common method of controlling streamer separations for more regular spatial sampling and for avoiding streamer entanglement. A known problem in estimating the shape of a laterally steered streamer is accounting for the local shape distortions caused by the lateral forces applied by the lateral-steering devices against the streamer. Typically, these devices kink the streamer, especially when applying a substantial lateral force to steer the streamer to port or starboard. The kink represents a discontinuity in the first derivative or the tangent to the streamer at the point on the streamer where the lateral force is applied. The magnitude of this local shape distortion increases as the tension in the streamer decreases toward its tail.

Thus, there is a need for better estimates of the shapes of laterally steered streamers.

SUMMARY

One version of a seismic streamer system embodying features of the invention comprises a seismic streamer that extends in length from a head end to a tail end. Lateral-steering devices attached to the streamer apply a lateral force at spaced apart steering positions along the length of the streamer. The lateral-steering devices divide the streamer into a series of contiguous streamer segments. Each segment extends from a fore end at a steering position to an aft end at the next consecutive steering position closer to the tail end of the streamer. A plurality of first and second heading sensors producing heading readings are disposed along the length of the streamer. Each of the first heading sensors is disposed in one of the streamer segments closer to the fore end than to aft end. Each of the second heading sensors is disposed in one of the streamer segments proximate the aft end of the segment. Means for estimating streamer shape computes a shape estimate of the streamer segments as a function of the heading readings of the first and second heading sensors in the streamer segment.

In another aspect of the invention, a method for estimating the shape of a seismic streamer comprises: (a) attaching lateral-steering devices at spaced apart steering positions along the length of the seismic streamer to divide the streamer into a series of contiguous streamer segments between the steering positions of consecutive lateral-steering devices; (b) positioning first heading sensors providing first heading readings along a forward portion of each streamer segment; (c) positioning second heading sensors providing second heading readings along an aft portion of each segment proximate a lateral-steering device; and (d) computing an estimated shape of each streamer segment as a function of the first and second heading readings from the heading sensors in the streamer segment.

In yet another aspect of the invention, a method for estimating the shape of a seismic streamer steered laterally by lateral-steering devices disposed along the streamer's length comprises: (a) defining a series of contiguous streamer segments between the positions of consecutive lateral-steering devices; and (b) modeling the shape of each streamer segment as linear along a forward portion of the segment and as curved along an aft portion of the segment.

BRIEF DESCRIPTION OF THE DRAWINGS

These aspects and features of the invention, as well as its advantages, are better understood by referring to the following description, appended claims, and accompanying drawings, in which:

DETAILED DESCRIPTION

Figure 1:
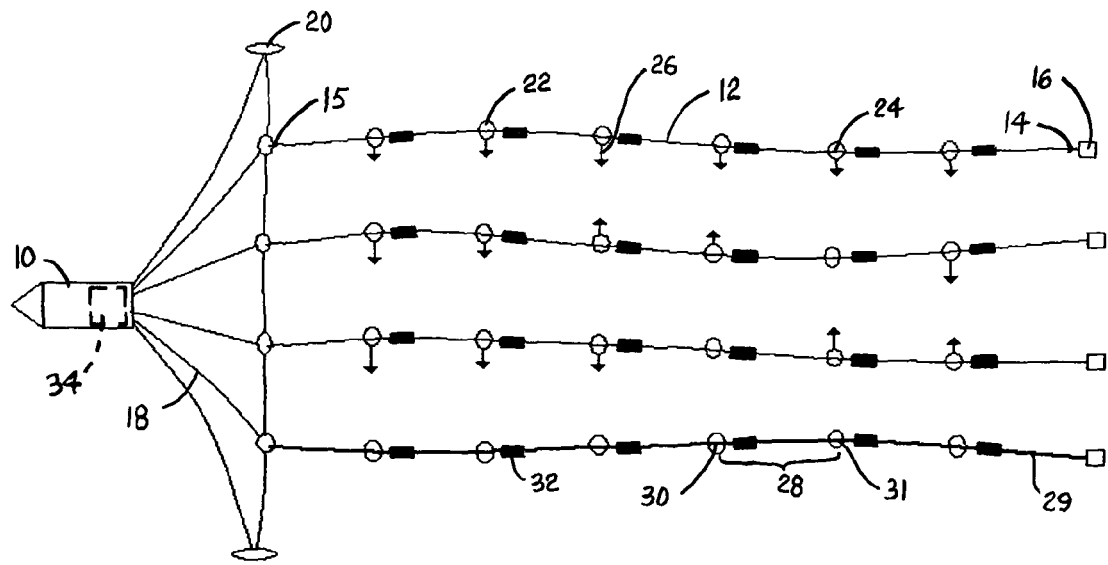
FIG. 1 is a top plan schematic view of a survey vessel towing laterally steered streamers in a streamer system embodying features of the invention.

A seismic streamer system embodying features of the invention is shown in FIG. 1. A survey vessel 10 tows the plurality of streamer cables 12 whose tail ends 14 are tethered to tail buoys 16. Head ends 15 of the streamers 12 are attached to a system of tow cables and tethers 18 attached to the rear deck of the vessel 10. Paravanes 20 are used to maintain a wide spread of the deployed streamer network. Lateral-steering devices 22—disposed at spaced apart steering positions 24, or steering nodes, e.g., every 300 m, along the length of each streamer—exert lateral forces 26 to drive the streamer to starboard or port. The lateral-steering devices 22 divide each streamer 12 into a series of contiguous streamer segments 28. Each segment extends rearward from a fore end 30 at a forward steering position 24 to an aft end 31 at the next consecutive steering position. The last, or rearmost, streamer segment 29, unlike the other segments, does not terminate at its aft end in a cable-steering device. Instead, its aft end is tethered to its tail buoy 16 on the sea surface. Heading sensors 32 are also attached to the streamer in each segment. The heading sensors may reside within the streamer itself, be housed in inline streamer control devices, or be housed in external streamer control devices, such as depth-control or lateral steering devices rotatably attached to the streamer. Each streamer segment has a heading sensor positioned closer to its fore end than to its aft end.

A controller 34 aboard the survey vessel 10 is connected to the heading sensors, lateral steering devices, and depth-control devices by a communications link such as a hardwired link running along the tow cables 18 and through the streamers 12. The controller receives readings from the heading sensors and other data from devices on the streamer and sends control commands to the lateral-steering devices and depth-control devices over the link as required.

Figure 2:
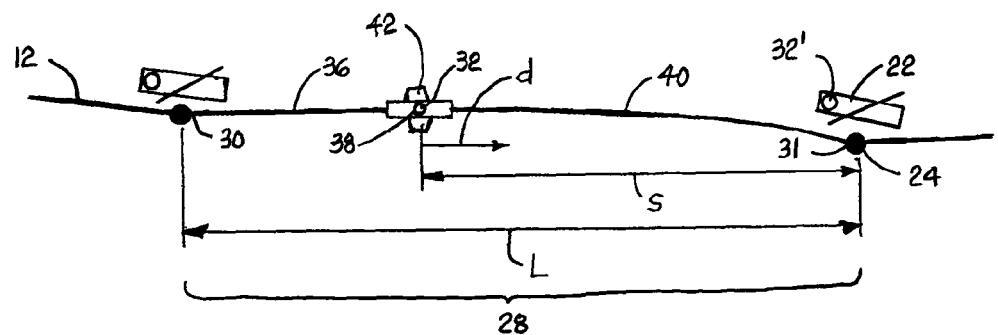
FIG. 2 is a top plan enlarged schematic view of a portion of one of the streamers of FIG. 1.

As shown in the enlarged view of FIG. 2, the streamer 12 tends to distort, or kink, at the steering positions 24 because of the lateral force exerted by the lateral-steering device 22 against the streamer at these positions. Because of the tension in the streamer resulting from being towed through the water, the shape of each streamer segment 28 of length L between the steering position 24 of consecutive lateral-steering devices 22 is generally straight for the first 25%-50% of the segment and then curves gently in the direction of lateral movement in the rest of the segment. The curvature increases rearward along the segment to the aft steering position. The magnitude of the curvature depends on the amount of lateral force applied by the lateral-steering device at the aft end of the segment. Consequently, the shape of the streamer segments may be approximated by a linear portion 36 that extends from the fore end 30 to an intermediate point 38, which may coincide with the position of a heading sensor 32 at the rear end of the linear portion, and by a contiguous curved region 40 that extends from the intermediate point to the aft end 31 of the segment.

The heading sensor 32 attached to the forward, linear portion 36 of the streamer segment may be a self-contained device within the streamer or be housed in a depth-control device 42 as shown or other kind of streamer control device. A second heading sensor 32' is disposed proximate the steering position 24 at the aft end of the segment. The second heading sensor 32' may be self-contained or housed in the lateral-steering device or in another streamer control device in front of the steering position, i.e., just ahead of the kink in the streamer.

Each segment is modeled from fore end to aft end as a linear portion 36 whose tangent equals the heading reading $\theta_1$ of the heading sensor 32 in the forward portion of the segment and a contiguous curved portion 40 whose tangent is approximated by an exponential function that depends on the heading reading $\theta_1$ of the forward heading sensor 32 and the heading reading $\theta_2$ of the heading sensor 32' at the aft end. In the model, the tangent to the linear portion and to the curved portion are equal at their junction at the intermediate point 38. Thus, the model produces an estimated shape of the streamer section by computing tangents T to the forward, linear portion and to the aft, curved portion from the heading readings. The tangent $T_L$ at each point on the linear portion is given by $T_L=\theta_1$. The tangent $T_C$ to the curved portion at each point is given by $T_C=\theta_1+(\theta_2-\theta_1)\cdot(d/s)^p$, where s is the length of the curved portion, d is the distance of the point along the streamer segment measured rearward from the intermediate point, and p is an empirically determined exponent, e.g., 2.5. The ratio d/s is the percentage distance along the curved portion of each point on the curved portion. Because the last streamer segment 29 attached to the tail buoy does not terminate in a lateral-steering device, it is modeled as a linear segment whose tangent $T_L=\theta_1$.

The shipboard controller 34, which receives all the heading readings from the heading sensors, can compute a more or less real-time shape estimate of the streamers in a streamer-shape estimating software routine that implements the mathematical model. The shape of each of the streamers is a piecewise connection of the shapes of the individual streamer segments. The streamer shape may also be estimated off-line by data-processing computers using the model on stored heading readings or later-refined heading readings. Either of these means for estimating streamer shape may be used.

Although the invention has been described in detail with respect to a few preferred versions, other versions are possible. For example, a heading sensor was shown in FIG. 2 as coincident with the intermediate point at the junction of the linear and curved portions of the streamer segment. But the heading sensor can be attached forward of the intermediate point anywhere in the forward, linear portion. So, as this example suggests, the versions described in detail are meant to exemplify features of the invention.

What is claimed is:

1. A seismic streamer system comprising:
  a seismic streamer extending in length from a head end to a tail end;
  a plurality of lateral-steering devices attached to the streamer to apply a lateral force at spaced apart steering positions along the length of the streamer, wherein the lateral-steering devices divide the streamer into a series of contiguous streamer segments, each segment extending from a fore end at a steering position to an aft end at the next consecutive steering position closer to the tail end of the streamer;
  a plurality of first heading sensors disposed along the length of the streamer, each of the first heading sensors disposed in one of the streamer segments closer to the fore end than to the aft end and producing heading readings;
  a plurality of second heading sensors disposed along the length of the streamer, each of the second heading sensors disposed in one of the streamer segments proximate the aft end of the streamer segment and producing heading readings; and
  means for estimating streamer shape by modeling the shape of each of the streamer segments with a linear portion extending from the fore end to an intermediate point between the fore end and the aft end and a curved portion extending from the intermediate point to the aft end and computing a shape estimate of each of the streamer segments between consecutive lateral-steering devices from the model of the shape and the heading readings of the first and second heading sensors in the streamer segment.

2. A seismic streamer system as in claim 1 wherein each of the plurality of second heading sensors is contained in a lateral-steering device.

3. A seismic streamer system as in claim 1 further comprising a plurality of streamer control devices attached to the seismic streamer in the fore ends of each of the streamer segments and containing the plurality of first heading sensors.

4. A seismic streamer system as in claim 1 wherein the means for estimating streamer shape resides in a controller on a survey vessel that receives the heading readings from the first and second heading sensors over a communications link.

5. A seismic streamer as in claim 1 wherein the first heading sensor in each streamer segment is located at the intermediate point.

6. A seismic streamer system as in claim 1 wherein the tangent to the linear portion is given by the heading reading of the first heading sensor in the streamer segment.

7. A seismic streamer system as in claim 1 wherein the tangent to the curved portion is a function of the difference between the heading reading of the first heading sensor and the heading reading of the second heading sensor in the streamer segment.

8. A seismic streamer system as in claim 7 wherein the difference between the heading reading of the first heading sensor and the heading reading of the second heading sensor is exponentially scaled by the percentage distance along the curved portion of the streamer segment raised to an empirically determined exponent.

9. A seismic streamer system as in claim 1 further comprising a tail buoy attached to the tail end of the seismic streamer at the aft end of a last streamer segment that extends from the lateral-steering device at the aft end of the contiguous segment and wherein the last streamer segment includes a heading sensor.

10. A seismic streamer system as in claim 9 wherein the means for estimating streamer shape computes a shape estimate of the last streamer segment aft of the last lateral-steering device as linear with a tangent given by the heading reading of the heading sensor disposed in the last streamer segment.

11. A method for estimating the shape of a seismic streamer, comprising:
- attaching lateral-steering devices at spaced apart steering positions along the length of a seismic streamer to divide the seismic streamer into a series of contiguous streamer segments between the steering positions of consecutive lateral-steering devices;
- positioning first heading sensors providing first heading readings $\theta_1$ along a forward portion of each streamer segment;
- positioning second heading sensors providing second heading readings $\theta_2$ along an aft portion of each streamer segment proximate a lateral-steering device;
- modeling each streamer segment as a linear portion from the start of each streamer segment rearward to an intermediate point and a curved portion from the intermediate point rearward to the end of the streamer segment;
- computing from the model an estimated shape of each streamer segment as a function of the first heading reading in the linear portion and as a function of the first and second heading readings in the curved portion of the streamer segment.

12. The method of claim 11 comprising housing the second heading sensors with the lateral-steering devices.

13. The method of claim 11 comprising housing each of the first heading sensors together with a streamer control device attached to each streamer segment.

14. The method of claim 11 wherein the tangent to the linear portion is given by $\theta_1$ and the tangent to the curved portion is given by $\theta_1+(\theta_2-\theta_1)\cdot(d/s)^p$, where d is the distance along the aft portion, s is the length of the aft portion, and p is an empirically determined exponent.

15. A method for estimating the shape of a seismic streamer steered laterally by lateral-steering devices disposed along its length, comprising:
- defining a series of contiguous streamer segments between the positions of consecutive lateral-steering devices on a seismic streamer;
- receiving over a communications link first heading readings $\theta_1$ from a first heading sensor disposed in a forward portion of each of the streamer segments and second heading readings $\theta_2$ from a second heading sensor disposed in an aft portion of each of the streamer segments;
- modeling the shape of each streamer segment as linear along a forward portion of the streamer segment and as curved along an aft portion of the streamer segment;
- producing an estimated shape of each streamer segment that is linear in the forward portion from only the first heading readings $\theta_1$ and that is curved in the aft portion from the first heading readings $\theta_1$ and second heading readings $\theta_2$.

16. The method of claim 15 wherein the tangent to the linear forward portion is given by $\theta_1$ and the tangent to the curved aft portion is given by $\theta_1+(\theta_2-\theta_1)\cdot(d/s)^p$, where d is the distance along the aft portion, s is the length of the aft portion, and p is an empirically determined exponent.

* * * * *